April 24, 1928.

O. POLLOK 1,667,674

SYSTEM OF DISTRIBUTION

Filed May 9, 1925

Inventor:
Othmar Pollok,
by
His Attorney.

Patented Apr. 24, 1928.

1,667,674

UNITED STATES PATENT OFFICE.

OTHMAR POLLOK, OF BERLIN-HALENSEE, GERMANY, ASSIGNOR TO GENERAL ELECTRIC COMPANY, A CORPORATION OF NEW YORK.

SYSTEM OF DISTRIBUTION.

Application filed May 9, 1925, Serial No. 29,201, and in Germany July 18, 1924.

This invention relates to a system of distribution and more particularly to a system in which a mercury arc rectifier is employed in connection with translation devices capable of developing a counter electromotive force.

It is known that current is normally transmitted only in one direction between alternating and direct current circuits which are interconnected through a mercury arc rectifier, and that, if current is supplied from the direct current circuit to a translating device such as a hoist motor, a motor for machine drive or the like, the counter-electromotive force of the translating device is likely to become excessively high due to the fact that current can not be transmitted through the rectifier in the reverse direction when the translating device is driven by its load. The principal object of my invention is to provide means operable to complete a circuit in shunt to the rectifier when the counter-electromotive force of the translating device exceeds a predetermined value.

Figure 1:
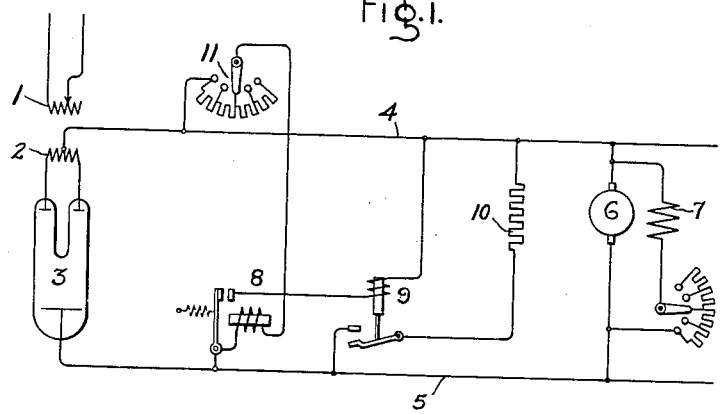
Figure 2:
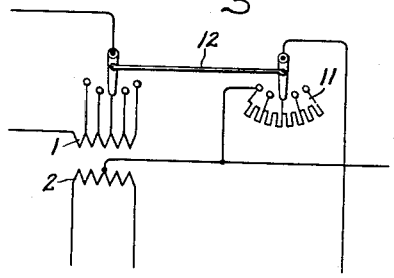

The novel features which I believe to be characteristic of my invention are set forth with particularity in the appended claims. My invention itself, however, both as to its organization and method of operation will best be understood by reference to the following description taken in connection with the accompanying drawing in which Fig. 1 shows a circuit organization whereby my invention may be carried into effect; Fig. 2 shows a modification wherein the voltage necessary to operate the voltage responsive relay may be simultaneously varied with the alternating voltage impressed on the rectifier.

On the drawing I have indicated at 1, a primary transformer winding which is connected to a source of alternating current, and inductively related to a secondary winding 2, the terminals of which are connected to the anodes of a mercury vapor rectifier 3. A direct current consumption circuit comprising mains 4 and 5 is connected to the rectifier 3 in the usual manner.

Associated with the direct current consumption circuit is a motor comprising an armature 6 and a field winding 7. A relay 8, which is preferably of a type sensitive to slight changes in voltage, controls the operation of a second relay 9. The latter relay controls a resistance 10 which may be connected in circuit with the rectifier and in shunt with the motor when the counter electromotive force of the motor exceeds the voltage impressed on the consumption or load circuit.

Means comprising a variable resistance 11 may be employed to control the voltage applied to relay 8. Under certain circumstances however it may be desirable to vary this resistance simultaneously with variations in the alternating voltage impressed on the rectifier. Such means is shown in Fig. 2 wherein a connecting rod 12 causes variation of resistance 11 as the voltage on the rectifier is varied.

In operation of the device any increase in the counter electromotive force of the motor above a predetermined amount will cause operation of relay 8. Operation of relay 8 will cause energization of relay 9 to insert the auxiliary load or resistance 10 in circuit with the rectifier and in shunt with the motor. The resistance element will be maintained in circuit until the voltage falls to normal whereupon relay 8 will open the circuit of relay 11 and the latter relay will open the circuit including the resistance 10.

While I have shown and described the preferred embodiment of my invention it is apparent that many modifications thereof may be made without departing from the scope of my invention as set forth in the appended claims.

What I claim as new and desire to secure by Letters Patent of the United States is:—

1. In a system of distribution a source of alternating current, a direct current consumption circuit, a rectifier connected therebetween, a resistance element associated with said rectifier, and means operable in response to slight variations in the voltage of said direct current circuit for effecting the connection of said resistance element to said rectifier in shunt to said direct current circuit.

2. In a system of distribution a source of alternating current, a direct current consumption circuit, an asymmetric conducting device therebetween, a translation device capable of generating a counter electromotive force connected to said circuit, a resistance element associated with said device, and means responsive to the counter electromotive force of said translation device for connecting said resistance to said device.

3. In a system of distribution a source of alternating current, a direct current consumption circuit, an asymmetric conducting device therebetween, a translation device capable of generating a counter electromotive force connected to said circuit, a resistance element associated with said circuit, switching means for connecting said resistance to said circuit and means responsive to the counter electromotive force of said translation device for governing the operation of said switching means.

4. In a system of distribution a source of alternating current, a direct current consumption circuit, an asymmetric conducting device therebetween, a translation device capable of generating a counter electromotive force connected to said consumption circuit, a resistance element associated with said device and means responsive to said counter electromotive force for connecting said resistance to said device and in shunt with said translation device.

5. In a system of distribution a source of alternating current, a direct current consumption-circuit an asymmetric conducting device connected therebetween, a voltage responsive relay associated with said consumption circuit, a variable resistor in circuit with said relay and means for simultaneously varying said resistor and the alternating voltage impressed on the conducting device.

In witness whereof I have hereunto set my hand this 23rd day of April, 1925.

OTHMAR POLLOK.